(12) United States Patent
Tokunaga

(10) Patent No.: US 6,705,030 B2
(45) Date of Patent: Mar. 16, 2004

(54) WHEEL LOADER

(75) Inventor: Kaoru Tokunaga, Oyama (JP)

(73) Assignee: Komatsu Ltd. (JP)

( * ) Notice: Subject to any disclaimer, the term of this patent is extended or adjusted under 35 U.S.C. 154(b) by 72 days.

(21) Appl. No.: 10/106,380

(22) Filed: Mar. 27, 2002

(65) Prior Publication Data

US 2002/0148144 A1 Oct. 17, 2002

(30) Foreign Application Priority Data

Apr. 12, 2001 (JP) ........................... 2001-114641

(51) Int. Cl.$^7$ ............................... E02F 9/20; F16H 3/72
(52) U.S. Cl. ............................. 37/348; 477/5
(58) Field of Search ................ 37/348, 347; 172/2–11; 477/1, 2, 5, 153, 123, 124

(56) References Cited

U.S. PATENT DOCUMENTS

| | | | |
|---|---|---|---|
| 5,717,303 A | * | 2/1998 | Engel .......................... 318/376 |
| 5,789,896 A | * | 8/1998 | Fischer et al. .............. 318/759 |
| 6,275,004 B1 | * | 8/2001 | Tamai et al. ................. 320/118 |
| 6,371,882 B1 | * | 4/2002 | Casey et al. ..................... 477/5 |

FOREIGN PATENT DOCUMENTS

JP      7-39675      5/1995

* cited by examiner

*Primary Examiner*—Robert E. Pezzuto
(74) *Attorney, Agent, or Firm*—Rader, Fishman & Grauer PLLC

(57) ABSTRACT

A wheel loader, which reduces fuel consumption and eliminates lack of output power of an engine, is provided. For this purpose, the wheel loader is a wheel loader performing operations by driving a hydraulic pump (8) for driving a working machine and driving wheels (6) of a vehicle (101) by an engine (1), and includes a first electric motor (11) capable of transmitting torque to the driving wheels, an electricity accumulation device (13) for transferring electric energy to and from the first electric motor, and a controller (10, 20) for controlling a generating operation of the first electric motor that receives torque transmission from the driving wheels and generates electric power at the time of a decelerating operation of the vehicle, and storing generated electric energy into the electricity accumulation device.

7 Claims, 4 Drawing Sheets

WHEEL LOADER

TECHNICAL FIELD

The present invention relates to a wheel loader.

BACKGROUND ART

A wheel loader is generally used to excavate a natural ground with a bucket and load it into a dump truck. FIG. 4 shows a series of driving pattern from excavation of a wheel loader 101 to loading into a dump track 103, and this is a driving pattern called V-shape driving, which is the most frequently used (for example, Japanese Patent Application Publication No. 7-39675). Specifically, the wheel loader 101 travels forward to a natural ground 102 in a forward second speed gear (F2) (driving W1). When it approaches the natural ground 102 (0.5 m to 1.0 m), it thrusts into the natural ground 102 in a forward first speed gear (F1) in order to increase tractive force for the case in which an excavating operation is performed (driving W2). When the excavation is finished, the wheel loader 101 is retreated from an excavating operation position at a high speed in a reverse second speed gear (R2) (driving W3). Subsequently, a traveling direction of the wheel loader 101 is changed, and make it approach the dump truck 103 at a high speed in F2 (driving W4). When a loading operation for the dump truck 103 is finished, the wheel loader moves away from the dump truck 103 at a high speed in R2 (driving W5).

The V-shape driving is performed in a cycle time of about 30 seconds. In one cycle, the wheel loader moves forward and rearward twice, and it is general to perform a forward and reverse travel switching operation during traveling with use of vehicle inertia absorption action in fluid coupling such as a torque converter at a time of switching forward and reverse travel to shorten the cycle time during an operation. For example, when it shifts from the driving W3 to the driving W4, an operator returns an accelerator at a speed near to the maximum speed during revere traveling of the driving W3, switches the gear from reverse to forward travel by a shift operation, and depresses an accelerator pedal to decelerate with engine output power. A brake pedal is operated to such an extent as to be pressed lightly.

However, the aforementioned prior art has the disadvantages that will be described hereinafter. Specifically, deceleration during reverse travel is performed by an accelerator operation in the shift to forward travel, and deceleration during forward travel is performed by an accelerator operation in the shift to reverse travel with use of engine output power, and therefore fuel economy becomes unsatisfactory, a large-sized radiator is needed due to the problem of heat balance.

When it shifts to the driving W4 after the engine revolution reduces, the vehicle (1) performs a steering operation,
(2) performs a boom raising operation in loading,
(3) accelerates a vehicle body forward, and
(4) accelerates an engine itself at the same time, and therefore the output power of the engine becomes insufficient to impair start-up of engine revolution, which sometimes causes poor acceleration.

SUMMARY OF THE INVENTION

The present invention is made in view of the above-described disadvantages, and its object is to provide a wheel loader, which reduces fuel consumption and which is excellent in accelerating ability, eliminating lack of output power of an engine.

In order to attain the above-described object, a first aspect of the wheel loader according to the present invention has a structure in which in a wheel loader performing operations by driving an hydraulic pump for driving a working machine and driving wheels of a vehicle by an engine, the wheel loader includes a first electric motor capable of transmitting torque to the driving wheels, electricity accumulation means for transferring electric energy to and from the first electric motor, and a controller for controlling a generating operation of the first electric motor that receives torque transmission from the driving wheels and generates electric power at the time of a decelerating operation of the vehicle, and storing generated electric energy into the electricity accumulation means.

According to the above structure, regenerative braking is carried out by the first electric motor at the time of the decelerating operation of the vehicle, and kinetic energy held by the vehicle is converted into electric energy and stored. Consequently, it is not necessary to use engine output power to decelerate as in the prior art, thus improving fuel economy, and making it possible to reduce the size of the radiator as a result of improvement in heat balance.

Further, the wheel loader may have the structure in which the controller controls discharge of the electric energy stored in the electricity accumulation means, and controls a motor operation of the first electric motor to transmit torque to the driving wheels, at the time of an accelerating operation of the vehicle.

According to the above structure, with use of the electric energy stored in the electricity accumulation means by regenerative braking, the motor operation of the first electric motor is performed at the time of an accelerating operation of the vehicle to assist engine output power to drive the driving wheels. As a result, the load on the engine is reduced and lack of output power can be prevented and accelerating ability of the vehicle can be improved.

Further, the wheel loader may have the structure in which the wheel loader includes a second electric motor capable of transmitting torque to the hydraulic pump, and in which electricity accumulation means is capable of transferring electric energy to and from the second electric motor, and the controller controls discharge of the electric energy stored in the electricity accumulation means, and controls a motor operation of the second electric motor to transmit torque to the hydraulic pump, at the time of operating a working machine of the vehicle.

According to the above structure, with use of the electric energy stored in the electricity accumulation means by regenerative braking, the motor operation of the second electric motor is performed at the time of operating the working machine of the vehicle to assist the engine output power to drive the hydraulic pump, thus reducing the load on the engine and making it possible to prevent the lack of the output power.

Further, the wheel loader may have a structure in which the wheel loader includes a resister capable of being connected to the first electric motor, and in which the controller has function of detecting a charge amount of the electricity accumulation means, and supplies electric energy generated by the first electric motor to the resistor when the controller detects that the charge amount of the electricity accumulation means reaches full charge.

According to the above structure, when the charge means reaches the full charge, the electric energy generated as a result of regenerative braking can be consumed in the resister, and therefore even if the electricity charge means is the full charge, regenerative braking is possible. Accordingly, it is not necessary to use engine output power to decelerate as in the prior art, and fuel economy is improved and the radiator can be reduced as a result of improvement in heat balance.

A second aspect of the wheel loader according to the present invention has a structure including an engine, a generator driven by the engine, electricity accumulation means for storing electric energy generated by the generator, a first electric motor capable of transferring the electric energy to and from the electricity accumulation means and transmitting torque to driving wheels of a vehicle, a second electric motor capable of transferring the electric energy to and from the electricity accumulation means and transmitting torque to a hydraulic pump for driving a working machine, and a controller for controlling a generating operation of the first electric motor that receives torque transmission from the driving wheels and generates electric power, and storing generated electric energy in the electricity accumulation means, at the time of a decelerating operation of the vehicle.

According to the above structure, regenerative braking is performed by the first electric motor at the time of a decelerating operation of the vehicle, and the kinetic energy held by the vehicle is converted into the electric energy and stored. Consequently, since it is not necessary to use engine output power to decelerate as in the prior art, fuel economy is improved, and the radiator can be reduced in size as a result of improvement in heat balance.

BEST MODE FOR CARRYING OUT THE INVENTION

Preferred embodiments of the present invention will be explained in detail below with reference to the drawings.

Figure 1:
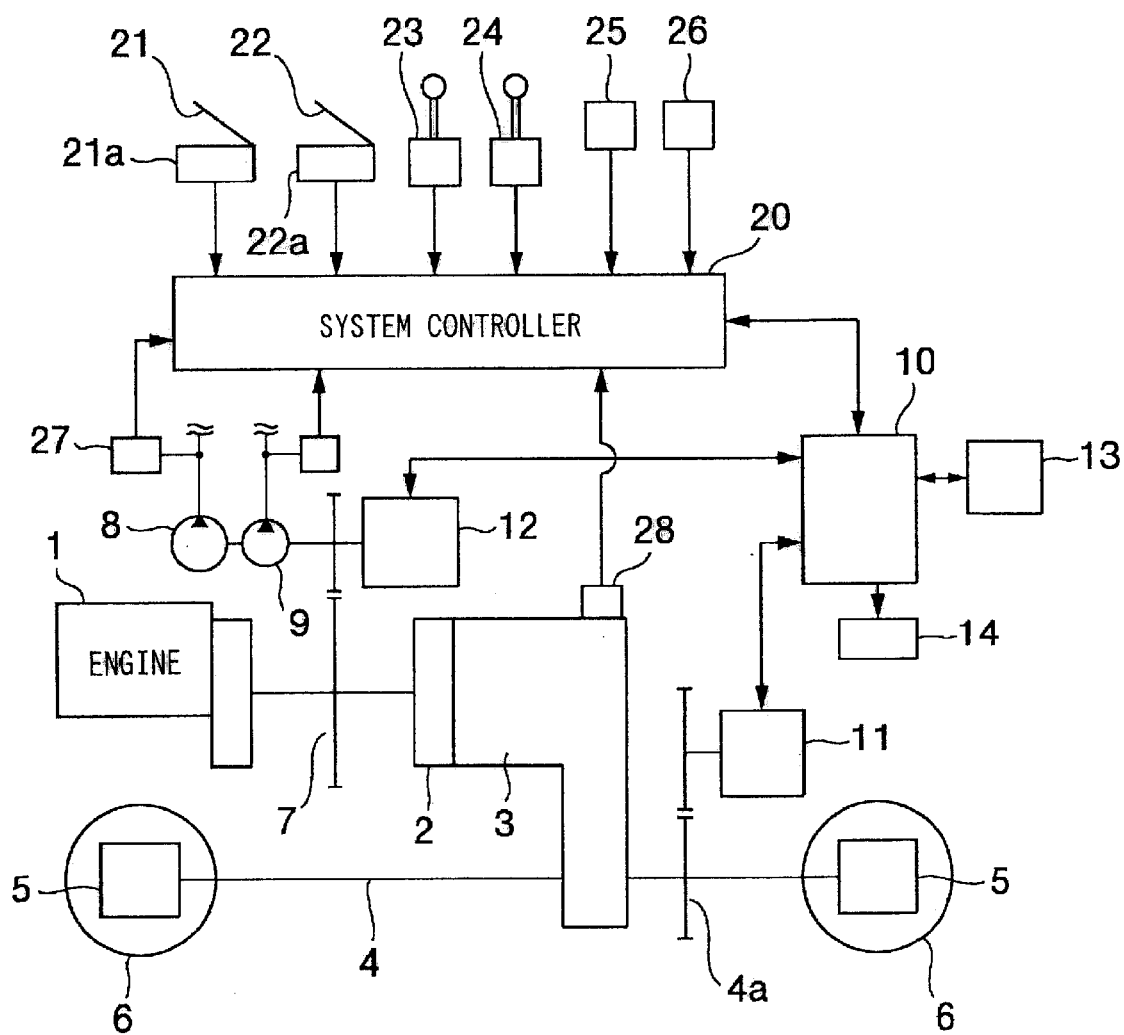
FIG. 1 is a system block diagram according to a first embodiment of the present invention.

In FIG. 1 that shows a first embodiment, output power of an engine 1 is transmitted to a transmission 3 via a torque converter 2, and it drives driving wheels 6 via a propeller shaft 4 and a differential 5. The transmission 3 includes a plurality of solenoid valves (not shown) for switching a clutch that can change speed gears, for example, of a first ($1^{st}$) to fourth ($4^{th}$) speed, and forward (F) or reverse (R) travel.

The output power of the engine 1 drives a hydraulic pump 8 for a working machine and a hydraulic pump 9 for steering via a gear train 7 provided between the engine 1 and the torque converter 2. Discharge fluid from the hydraulic pump 8 is supplied to a working machine hydraulic circuit (not shown) and drives the working machine (for example, a boom and a bucket, not shown). Discharge fluid from the hydraulic pump 9 is supplied to a steering hydraulic circuit (not shown) and drives a steering cylinder (not shown).

A first electric motor 11, a second electric motor 12, a capacitor 13, a resister 14 and a system controller 20 are connected to a power supply controller 10. The first electric motor 11 also serving as a generator is attached to a gear train 4a provided at the propeller shaft 4, and the second electric motor 12 also serving as a generator is attached to input shafts of the hydraulic pumps 8 and 9. The power supply controller 10 and the system controller 20 constitute a controller.

The capacitor 13 is, for example, an electric double layer condenser, which is low in energy density (stored energy per unit weight) as compared with a secondary battery such as a lithium ion battery. However, the capacitor 13 can pass comparatively high current, and thus it stores electric energy that is generated from a generating operation of the electric motors 11 and 12 as well as supplies electric power when the electric motors 11 and 12 perform a motor operation. The power supply controller 10 controls charge and discharge of the capacitor 13 and a generating operation or a motor operation of the electric motors 11 and 12, according to commands from the system controller 20 that will be described later. The power supply controller 10 detects a charge amount of the capacitor 13.

Into the system controller 20, inputted are i) an accelerator signal from an accelerator sensor 21a for detecting an operating amount of an accelerator 21, ii) a brake signal from a brake sensor 22a for detecting an operating amount of the brake 22, iii) an FR signal from a forward and reverse travel lever 23, iv) a speed gear signal from a speed change lever 24, v) a bucket angle signal from a bucket angle sensor 25 for detecting a rotation angle of the bucket, vi) a boom angle sensor from a boom angle sensor 26 for detecting a rotation angle of the boom, vii) a hydraulic signal from a pressure sensor 27 for detecting discharge pressure of the hydraulic pump 8, viii) a vehicle speed signal from a vehicle speed sensor 28 for detecting speed and a traveling direction of the vehicle, ix) a charge amount signal of the capacitor 13 from the power supply controller 10. The vehicle mentioned here means a wheel loader, and this will be called a vehicle 101 hereinafter.

The brake 22 is adjusted so that only regenerative braking that will be described later works until the operation amount reaches a predetermined operating amount and after it exceeds the predetermined operating amount, the hydraulic circuit of the brake is also operated. The accelerator sensor 21a, the brake sensor 22a, the bucket angle sensor 25 and the boom angle sensor 26 are sensors each of which is constituted with a potentiometer at its center. The forward and reverse travel lever 23 and the speed change lever 24 are switches using Hall ICs, and magnet fixed at each of the levers is detected by the Hall ICs placed corresponding to lever positions, whereby the lever positions are detected and the FR signal and the speed gear signal are outputted. The vehicle speed sensor 28 includes two electromagnetic pickups, which are attached to an output gear section of the transmission 3 and generate pulse voltage by rotation of gear teeth, and the two electromagnetic pickups are placed to be displaced by one-fourth of the tooth pitch. Thereby, the rotational direction (specifically, a traveling direction of the vehicle 101) as well as the rotational speed of the gear is detected.

Figure 2:
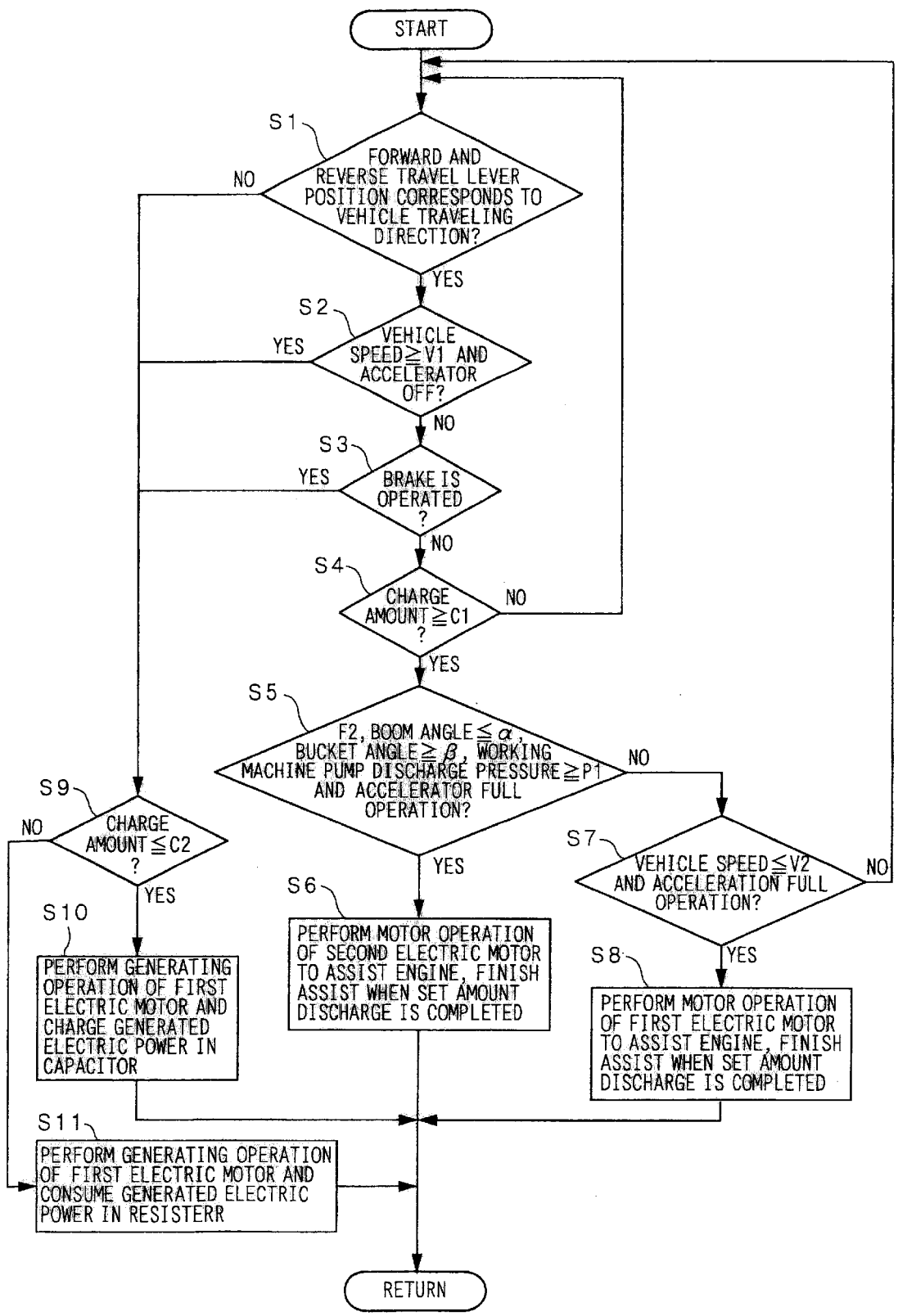
FIG. 2 is a flowchart according to the first embodiment.

With use of FIG. 2, the contents of a control of the system controller 20 will be explained. In step S1, the FR signal and the vehicle speed signal are compared and it is determined whether or not the position of the forward and reverse travel lever 23 corresponds to the traveling direction of the vehicle 101. When it corresponds thereto, a command is given to proceed to step S2. In step S2, it is determined whether or not the vehicle speed is not lower than a set vehicle speed V1 (for example, 10 km/h) and whether or not the accelerator is OFF (the accelerator is not operated) based on the accelerator signal. When the vehicle speed is lower than the set vehicle speed V1, or the accelerator is operated, a command is given to proceed to step S3. In step S3, it is determined whether or not the brake is operated based on the brake signal, and when the brake is not operated, a command is given to proceed to step S4. In step S4, it is determined whether or not the charge amount of the capacitor 13 is not less than a specified value C1 based on the charge amount signal. When the charge amount is less than the specified value C1, it is determined that the charge amount is insufficient, and a command is given to return to step S1. When the charge amount is not less than the specified value C1, a command is given to proceed to step S5.

In step S5, it is determined whether or not the position of the forward and reverse travel lever 23 is forward (F) based on the FR signal, whether or not the position of the speed change lever 24 is the second speed ($2^{nd}$) based on the speed gear signal, whether or not the boom angle is not more than a set angle α (the tip end of the boom is at a low position) based on the boom angle signal, whether or not the bucket angle is not less than a predetermined value β (the bucket is at a tilt position) based on the bucket angle signal, whether or not the discharge pressure of the hydraulic pump 8 for the working machine rises (not less than predetermined pressure P1) based on the hydraulic pressure signal, and whether or not the accelerator 21 is fully operated or not based on the accelerator signal. When it is "YES" in step S5, a boom raising operation is performed in a loaded state and at the same time the vehicle body is fully accelerated in the forward second gear (F2)(a driving W4 in a V-shaped driving), and in this case, the process in step S6 is performed. Specifically, the system controller 20 outputs a motor operation command for the second electric motor 12 to the power supply controller 10 in step S6, whereby the power supply controller 10 controls discharge of the capacitor 13 and the motor operation of the electric motor 12. The motor operation is finished when the capacitor 13 completes a predetermined amount of discharge.

When it is "NO" in step S5, a command is given to proceed to step S7, and it is determined whether or not the vehicle speed is not higher than a set vehicle speed V2 (for example, 5 km/h) based on the vehicle speed signal, and whether or not the accelerator 21 is fully operated based on the accelerator signal. When it is "NO" in step S7, a command is given to return to step S1. When it is "YES", it is the case in which the vehicle is fully accelerated in a low speed state, and the process in step S8 is performed. Specifically, in step S8, the system controller 20 outputs a motor operation command for the first electric motor 11 to the power supply controller 10, whereby the power supply controller 10 controls discharge of the capacitor 13 and the motor operation of the electric motor 11. The motor operation is finished when the capacitor 13 completes a predetermined amount of discharge.

When it is "NO" in step S1, or when it is "YES" in step S2, or when it is "YES" in step S3, deceleration is desired, and thus a command is given to proceed to step S9. In step S9, it is determined whether or not the charge amount of the capacitor 13 is not more than the specified value C2 (the charge amount substantially equal to full charge). When it is "YES", it does not reach full charge, and thus the process in step S10 is carried out in this case. Specifically, in step S10, the system controller 20 outputs a charge command for the capacitor 13 and a generating operation command for the first electric motor 11 to the power supply controller 10, whereby the power supply controller 10 controls the charge of the capacitor 13 and the generating operation of the electric motor 11. When it is "NO" in step S9, it reaches the full charge, and in this case, the process in step S11 is performed to prevent excessive charge. Specifically, in step S11, the system controller 20 outputs the generating operation command and an electric power discharge command for the first electric motor 11 to the power supply controller 10, whereby the power supply controller 10 controls the generating operation of the electric motor 11 and supplies the electric power generated from the electric motor 11 to the resister 14, where it is consumed.

According to the above structure, the electric motor 11 driven by the rotation of the driving wheels 6 is operated (regenerative operation) as the generator at the time of deceleration of the vehicle 101 to decelerate (regenerative braking), and therefore electric power generated from kinetic energy held by the vehicle 101 can be stored in the capacitor 13 being electricity accumlation means. Accordingly, it is unnecessary to use engine output power for deceleration as in the prior art. Even if the capacitor 13 reaches the full charge, the electric power generated from regenerative braking is consumed in the resistor 14, and therefore it is unnecessary to use output power of the engine 1 for deceleration. Consequently, fuel economy is improved and heat balance is improved, thus making it possible to use a small-sized radiator.

In addition, it is possible to drive the electric motors 11 and 12 by electric power stored as a result of regenerative braking (assist operation). Thereby, output burden of the engine 1 at the time of a heavy load operation, in which the boom raising operation is performed in a loaded state and at the same time the vehicle body is fully accelerated in the forward second speed gear (F2), can be reduced and the lack of the output power of the engine 1 can be prevented. In the vehicle 101 which is loaded with a large-sized engine in which insufficient output does not conventionally occur, a small-sized engine can be mounted instead of the large-sized engine, thus making it possible to improve fuel economy.

Acceleration of the vehicle 101 by the engine 1 is assisted by the motor operation of the electric motor 11 when the accelerator 21 is fully operated, not limited to at the time of heavy load operation, thus making it possible to improve accelerating ability of the vehicle 101. Further, tractive force of the vehicle 101 is assisted when excavating a natural ground, whereby excavating performance can be improved.

In the above-described first embodiment, the structure from which the second electric motor 12 is removed is also possible. In this structure, step S5 and step S6 are eliminated from the flowchart of FIG. 2, and when it is "YES" in step S4, a command is given to proceed to step S7. In this case, regenerative braking is also performed at the time of a decelerating operation and the engine 1 is also assisted in driving the driving wheels 6 with use of regeneration energy at the time of the full operation of the accelerator 21. As a result, it is not necessary to use engine output power at the time of deceleration as in the prior art, therefore making it possible to improve fuel economy, and the acceleration ability of the vehicle 101.

Further, in the above-described first embodiment, the capacity of the capacitor 13 is enough if it can store electric power required to carry out the motor operation of the electric motors 11 and 12 in one cycle of the repeated operations. There is the case in which the required electric power cannot be recovered only with the regenerative braking at the time of deceleration in one cycle. In this case, when the output power of the engine 1 has allowance, for example, when the working machine operation and steering operation are not performed, (specifically, when the discharge pressure of the hydraulic pumps 8 and 9 is lower than predetermined pressure), the second electric motor 12 may be operated as the generator and the generated electric power may be stored in the capacitor 13.

Further, the engine 1 may be constantly rotated at rated rotation during operation. When the output power has allowance, the electric power generated from the surplus torque may be charged, and the engine 1 may be assisted with the stored electric power when the output power of the engine 1 is insufficient. Thereby, the load exerted on the engine 1 can be leveled, and the engine size with its rated output power being conventionally adjusted to the maximum load can be reduced to that of the average load, thus making it possible to reduce the engine size and improve fuel economy. As the charge means, the capacitor 13 is cited as an example, but a secondary battery such as a lithium ion battery may be used as long as it meets the specification.

Figure 4:
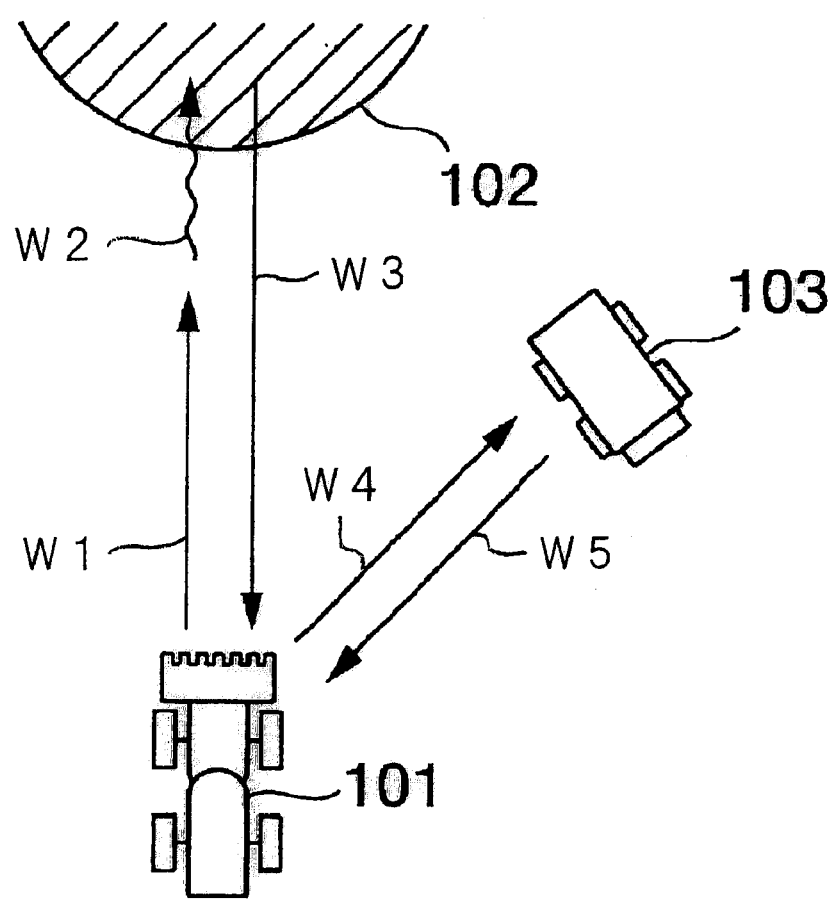
FIG. 4 is a diagram showing an ordinary V-shape driving pattern of a wheel loader according to a prior art.

The explanation is made with the V-shape driving, but the same effects can be obtained in I-cross driving, and load and carry driving. Here, the I-cross driving is the driving in which a dump truck 103 moves to an area between the wheel loader 101 and a natural ground 102 at each time of loading into the dump truck 103, explaining with reference to FIG. 4. The load and carry driving is the driving in which the forward traveling distance is longer as compared with the V-shape driving, and is performed, for example, earth and sand are carried to a hopper.

Figure 3:
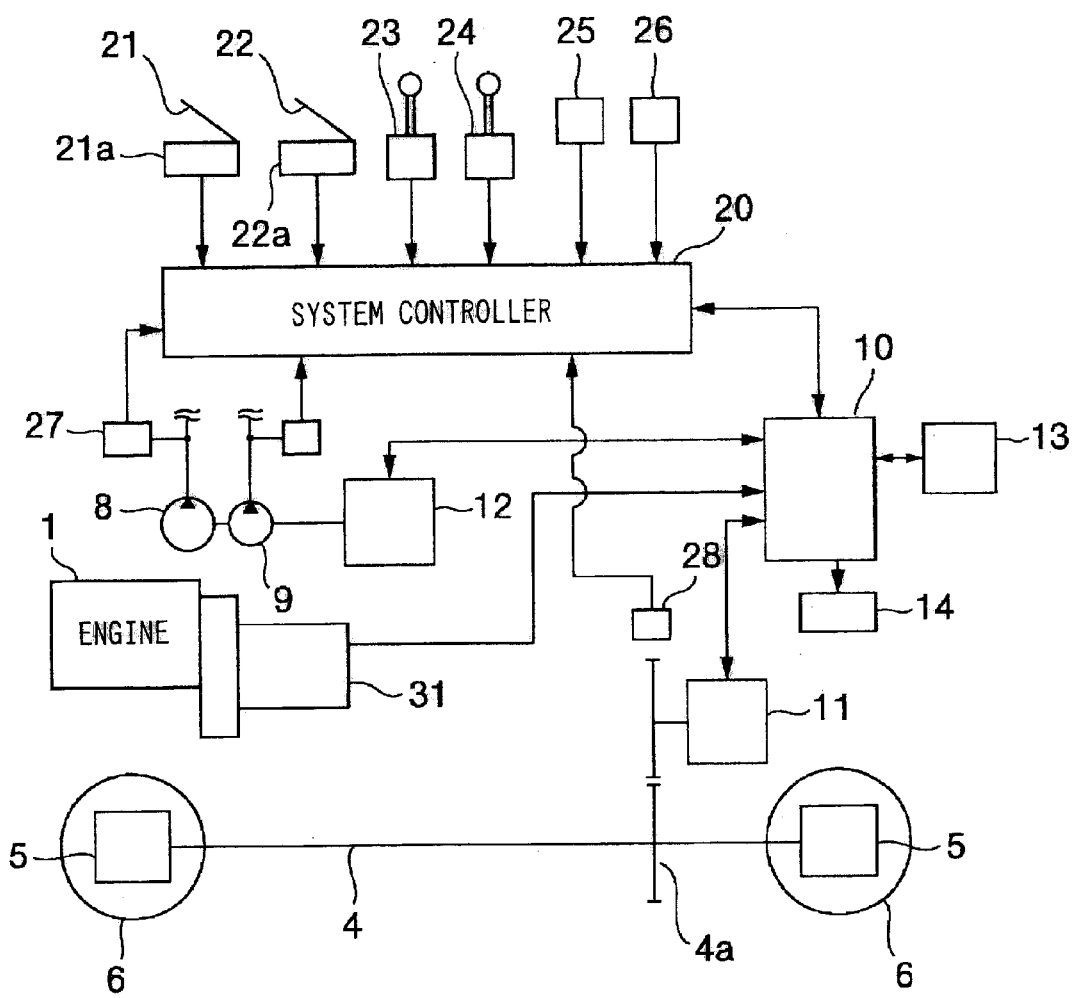
FIG. 3 is a system block diagram according to a second embodiment of the present invention.

Next, a second embodiment of the present invention will be explained with an electrically driven type of wheel loader as shown in FIG. 3 (specifically, the electrically driven type of the wheel loader 101). Explaining the structure different from FIG. 1, a generator 31 is connected to the engine 1, electric power generated by revolution of the engine 1 is stored in the capacitor 13 via the power supply controller 10. The driving wheels 6 are driven by the first electric motor 11 driven by being supplied with electric power from the capacitor 13. The hydraulic pumps 8 and 9 are driven by the second electric motor 12 driven by being supplied with electric power from the capacitor 13. The vehicle speed sensor 28 is attached to a gear section of the gear train 4a and detects the speed and the traveling direction of the vehicle 101.

In this structure, regenerative braking is also performed with use of the electric motor 11 at the time of deceleration of the vehicle 101, and generated electric power is stored, and discharged when necessary to drive the electric motors 11 and 12. The output power of the engine 1 is not used for braking, and energy is recovered by regenerative braking, therefore making it possible to reduce the conventional large-sized engine and improve fuel economy as in the aforementioned first embodiment. Further, by constantly revolving the engine 1 at rated revolutions, the engine can be further reduced in size and fuel economy can be further improved as described above.

As explained thus far, according to the present invention, regenerative braking is carried out at the time of deceleration of the vehicle, and therefore it becomes unnecessary to use the output power of the engine at the time of deceleration as in the prior art, thus making it possible to improve fuel economy and reduce the size of the radiator. Since the kinetic energy of the vehicle at the time of deceleration is converted into the electric energy by the regenerative braking and stored, and the engine output power is assisted by the stored electric energy at the time of acceleration of the vehicle and at the time of operation of the working machine, accelerating ability of the vehicle is improved, the lack of the output power of the engine can be prevented, and reduction in the size of the engine is made possible.

What is claimed is:

1. A wheel loader performing operations by driving an hydraulic pump for driving a working machine and driving wheels of a vehicle by an engine, comprising:
    a first electric motor capable of transmitting torque to said driving wheels;
    electricity accumulation means for transferring electric energy to and from said first electric motor; and
    a controller for controlling a generating operation of said first electric motor that receives torque transmission from said driving wheels and generates electric power at the time of a decelerating operation of said vehicle, and storing generated electric energy into said electricity accumulation means.

2. The wheel loader according to claim 1,
    wherein said controller controls discharge of the electric energy stored in said electricity accumulation means, and controls a motor operation of said first electric motor to transmit torque to said driving wheels, at the time of an accelerating operation of said vehicle.

3. The wheel loader according to claim 1 or claim 2, further comprising:
    a second electric motor capable of transmitting torque to said hydraulic pump,
    wherein said electricity accumulation means is capable of transferring electric energy to and from said second electric motor; and
    wherein said controller controls discharge of the electric energy stored in said electricity accumulation means, and controls a motor operation of said second electric motor to transmit torque to said hydraulic pump, at the time of operating a working machine of said vehicle.

4. The wheel loader according to claim 1, further comprising:
    a resister capable of being connected to said first electric motor,
    wherein said controller has function of detecting a charge amount of said electricity accumulation means, and supplies electric energy generated by said first electric motor to said resistor when said controller detects that the charge amount of said electricity accumulation means reaches full charge.

5. The wheel loader according to claim 1, wherein the controller includes a system controller portion and a power supply controller portion, the system controller portion operative for receiving and transmitting signals from and to the power supply controller portion and for receiving signals from a pressure sensor, an accelerator sensor, a brake sensor, a forward and reverse travel lever, a speed change lever, a bucket angle sensor and a boom angle sensor, the power supply controller portion operative for controlling the first electric motor, a second electric motor, a resistor and the electricity accumulation means based on receiving signals from the system controller portion.

6. A wheel loader, comprising:
    an engine;
    a generator driven by said engine;
    electricity accumulation means for storing electric energy generated by said generator;

a first electric motor capable of transferring the electric energy to and from said electricity accumulation means and transmitting torque to driving wheels of a vehicle;

a second electric motor capable of transferring the electric energy to and from said electricity accumulation means and transmitting torque to a hydraulic pump for driving a working machine; and a controller for controlling a generating operation of said first electric motor that receives torque transmission from said driving wheels and generates electric power, and storing generated electric energy in said electricity accumulation means, at the time of a decelerating operation of said vehicle.

7. The wheel loader according to claim 6, wherein the controller includes a system controller portion and a power supply controller portion, the system controller portion operative for receiving and transmitting signals from and to the power supply controller portion and for receiving signals from a pressure sensor, an accelerator sensor, a brake sensor, a forward and reverse travel lever, a speed change lever, a bucket angle sensor and a boom angle sensor, the power supply controller portion operative for controlling the first electric motor, a second electric motor, a resistor and the electricity accumulation means based on receiving signals from the system controller portion.

* * * * *